United States Patent [19]

Yoshizawa

[11] Patent Number: 5,479,838

[45] Date of Patent: Jan. 2, 1996

[54] TWO-STAGE DRIVE TYPE LEVER UNIT AND MACHINE APPARATUS USING THE SAME

[75] Inventor: Yasuo Yoshizawa, Yonezawa, Japan

[73] Assignee: Yoshiki Industrial Co., Ltd., Yamagata, Japan

[21] Appl. No.: 256,715

[22] PCT Filed: Dec. 28, 1992

[86] PCT No.: PCT/JP92/01720

§ 371 Date: Jul. 21, 1994

§ 102(e) Date: Jul. 21, 1994

[87] PCT Pub. No.: WO94/15118

PCT Pub. Date: Jul. 7, 1994

[51] Int. Cl.⁶ .................. B30B 1/06; F16H 21/44
[52] U.S. Cl. .................. 74/834; 74/522; 100/271
[58] Field of Search ............... 74/834, 490.1, 74/388 R, 522; 60/716; 100/271, 272, 283

[56] References Cited

U.S. PATENT DOCUMENTS

| 2,106,068 | 1/1938 | Sirch ................................. 74/522 |
| 2,491,548 | 12/1949 | Branson ........................... 74/522 |
| 3,613,465 | 10/1971 | Wood ................................ 74/522 |
| 4,565,105 | 1/1986 | Peterson ....................... 74/834 X |
| 5,182,967 | 2/1993 | Yoshizawa et al. ............ 74/834 |

FOREIGN PATENT DOCUMENTS

| 41-6555 | 4/1941 | Japan . |
| 52-21136 | 6/1977 | Japan . |
| 62-22025 | 5/1987 | Japan . |
| 62-228744 | 10/1987 | Japan . |
| 390295 | 4/1991 | Japan ...................... 100/283 |

Primary Examiner—Rodney H. Bonck
Assistant Examiner—Troy Grabow
Attorney, Agent, or Firm—Frishauf, Holtz, Goodman, Langer & Chick

[57] ABSTRACT

A lever unit 11 having a fulcrum regulator 12 movably connected to a first motor 14 and a force point regulator 13 movably connected to a second motor 15, in which the motor 15 is driven while the motor 14 is stopped, thereby moving an injection mold 20A to come close to the other mold 20B, and mold locking of the molds 20A and 20B is executed by driving the motor 15 at this position.

3 Claims, 5 Drawing Sheets

| ITEM | TOGGLE METHOD | CRANK METHOD | TWO-STAGE Z METHOD |
|---|---|---|---|
| 50-Ton MOLD LOCKING MOTOR | 22.785KW | 46KW | 13.36KW |
| MOTOR CAPACITY | ○ | △ | ◎ |
| RIGIDITY OF FRAME | ◎ | ○ | △ |
| SIMPLICITY OF STRUCTURE | △ | ◎ | ○ |
| SAFETY IN MOLD MOVEMENT | ○ | ○ | ◎ |
| PRESENCE/ABSENCE OF MOTOR REDUCTION GEAR | ◎ | △ | △ |
| PRESENCE/ABSENCE OF TIE BAR (WORKABILITY) | △ | △ | ◎ |
| EASINESS OF CONTROL | ○ | ○ | ○ |

TWO-STAGE DRIVE TYPE LEVER UNIT AND MACHINE APPARATUS USING THE SAME

TECHNICAL FIELD

The present invention relates to a two-stage drive type lever unit in which a force is applied first to a force point and then to a fulcrum, and a machine apparatus using the same.

BACKGROUND ART when, e.g., an injection mold is to be locked by using a pressing device, after a mold weighing, e.g., 100 kg is moved for 5 cm to a locking position, the mold is moved for only 1 mm to perform necessary mold locking. In mold locking, a pressure of 5,000 kgf is required to move a 100-kg mold for a travel of 1 mm. Although a kinetic energy of 100 kgf is sufficient for moving the 100-kg mold for 1 mm for initial positioning, 5,000 kgf is required to move this mold for the same distance of 1 mm for mold locking. Thus, if only one power source is provided, a kinetic energy of 5,000 kgf is required to move the mold for 5 cm as well. In this case, movement of 5 cm must be performed quickly, while mold locking of 1 mm must be performed slowly. Hence, a unit for changing the moving speed between movement and mold locking is also necessary. In a conventional pressing device, a lever unit is used to transmit a kinetic force from a power source to a press head, a force from the power source is applied to the force point of this lever unit, and the press head is connected to the action point. However, since an unnecessarily large power source must be used, the energy is wasted, and the apparatus becomes large in size.

DISCLOSURE OF INVENTION

It is, therefore, an object of the present invention to provide a small-size lever unit that can realize energy conservation, and a machine apparatus using the same.

According to the present invention, this object can be achieved by fabricating a two-stage drive type lever unit in which different power supplies are connected to the force point and fulcrum of the lever unit and a force is applied first to the force point and then to the fulcrum, and a machine apparatus using this lever unit.

Regarding the lever unit, the present inventor previously invented a lever unit in which the fulcrum is moved by the pivotal movement of a lever member and filed this invention as, e.g., PCT International Application No. PCT/JP90/00737 on Jun. 6, 1990 (now U.S. Pat. No. 5,182,967). The content of the previous PCT application is referred to and incorporated in the present application, so that a detailed description of the lever unit of the previous application will be omitted. Also, the present inventor made a PCT application of a lever unit as an improvement over the invention of the previous PCT application on the same day as that of the present application. It is clearly noted that the content described in this PCT application as an improvement is similarly referred to and incorporated in the present application.

BEST MODE OF CARRYING OUT THE INVENTION

The embodiments of the present invention will be described in detail with reference to the accompanying drawings.

Figure 1:
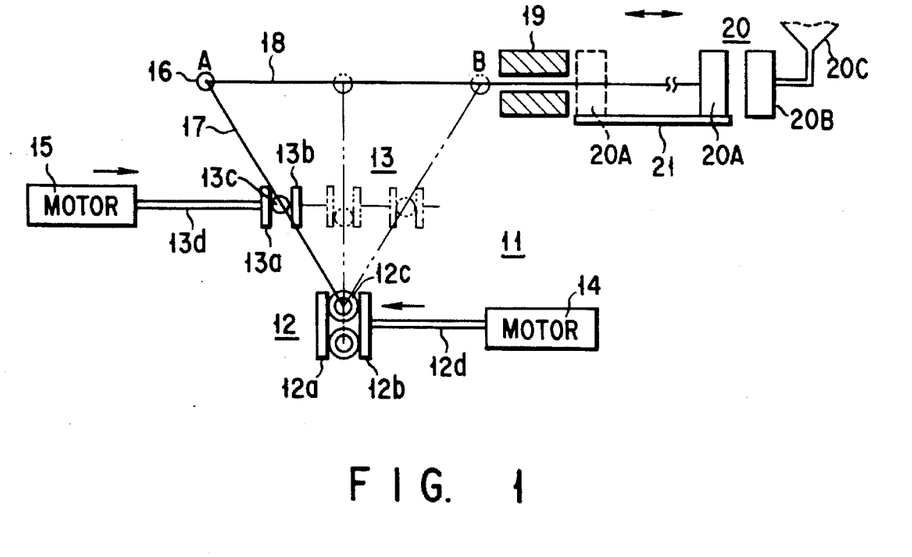
FIG. 1 is a diagram showing the schematic arrangement of a pressing device constituted by using a lever unit according to an embodiment of the present invention.

Referring to FIG. 1, a lever unit 11 has a movable fulcrum regulator 12 and a movable force point regulator 13. The detailed arrangement and operation of these regulators 11 and 12 are described in U.S. Pat. No. 5,182,967 based on the previous PCT application. In the present application, this previous PCT application will be cited as a reference and a detailed description thereof will be omitted.

The movable fulcrum regulator 12 has a structure in which a fulcrum roller 12c is inserted between parallel guide plates 12a and 12b. The movable fulcrum regulator 12 is connected to a first power source 14 through a connecting member 12d. The movable fulcrum regulator 12 is fixed in position while the movable force point regulator 13 is driven, and is thereafter driven by the first power source i.e., the motor 14 in a direction indicated by an arrow.

The movable force point regulator 13 has a structure in which a fulcrum roller 13c is inserted between parallel guide plates 13a and 13b. The movable force point regulator 13 is connected to a second power source i.e., a motor 15 through a connecting member 13d. The movable force point regulator 13 is driven by the second motor 15 in a direction indicated by an arrow while the movable fulcrum regulator 12 is kept stationary, and is thereafter fixed when the motor 14 is driven. As the motors 14 and 15, in addition to a known motor having a brake, a combination of a motor and a worm gear may be employed so that the positions of the regulators 12 and 13 are fixed when the motor is stopped.

The lever unit 11 has a lever member 17 having a fulcrum, a force point, and an action point respectively connected to the fulcrum roller 12c, the fulcrum roller 13c, and an action point link 16, and the link 16 is connected, through an output connecting member 18, to a driven member 20 which is supported by a guide member 19. As the driven member 20, an injection machine for a plastic material which has molds 20A and 20B is exemplified in this case. One mold 20A is connected to the distal end of the output connecting member 18 and is reciprocally moved on a rail 21 by the lever unit 11. The other mold 20B is connected to a hopper 20C, and a plastic material is injected into a cavity defined by the molds 20A and 20B.

In the arrangement of FIG. 1, the action point link 16 is first located at a position A, and one injection mold 20A is located at a position indicated by a broken line. Assume that the mold 20A weighs 100 kg. In order to quickly move the mold 20A to a mold locking position, where the other injection mold 20B is located, which is indicated by a solid line and separated by 5 cm, only the motor 15 is driven so that the movable force point regulator 13 is moved through the connecting member 13d in a direction indicated by an arrow, thereby moving the action point link 16 from the initial position A to a position B. At this time, the motor 14 is not driven, the movable fulcrum regulator 12 is fixed, and the fulcrum roller 12c merely moves between the guide plates 12a and 12b. Since the motor 15 merely moves the 100-kg mold 20A at 5 cm/sec, it suffices if the motor 15 has a capacity to output a kinetic energy of 100 kgf.

While the mold 20A is located at the position indicated by the solid line, the motor 14 is driven, thereby performing injection mold locking. At this time, the motor 15 is not driven, and the position of the movable force point regulator 13 is fixed. Note that the force point roller 13c can freely move between the guide plates 13a and 13b. When the motor 14 is driven, the movable fulcrum regulator 12 is driven for 1 mm, which corresponds to a mold locking travel, and injection mold locking is performed by the molds 20A and 20B. In this mold locking travel, a kinetic energy of 5,000 kgf is required for the 100-kg mold. However, since the travel is as small as 1 mm, if a large reduction ratio is set, the capacity of the motor 14 as the power source can be set small. After mold locking, the plastic material is injected, a mold locking pressure is applied again by the motor 14, and the mold 20A is returned by the motor 15, thereby ending one cycle.

In this manner, in the lever unit 11, when the movable force point regulator 13 and the movable fulcrum regulator 12 are sequentially driven by using the two power sources 15 and 14, the entire unit can be made small, thus realizing energy conservation. Since this embodiment has the movable fulcrum regulator 12, it additionally has the advantages of the lever unit disclosed in U.S. Pat. No. 5,182,967, as a matter of course.

Figure 2:
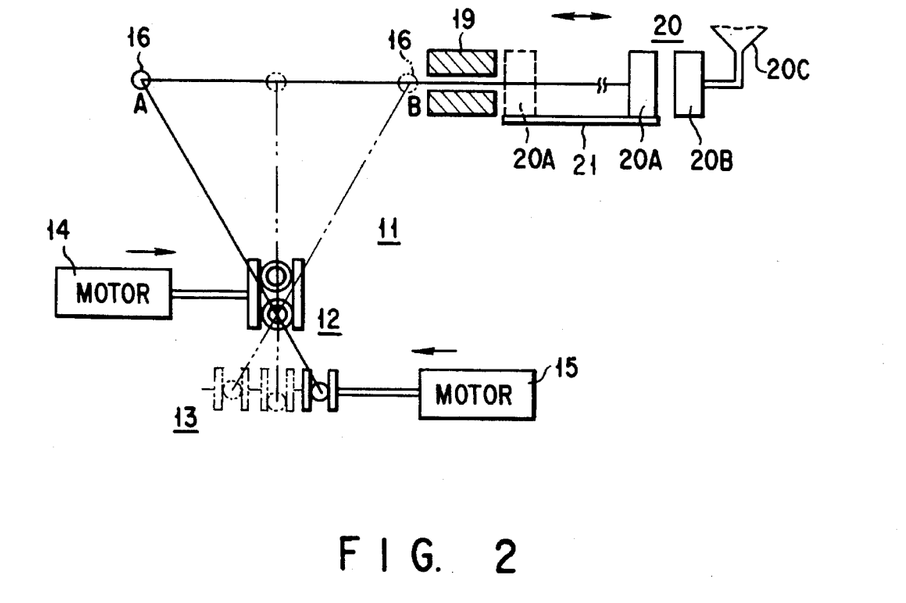
FIGS. 2 to 4 are diagrams showing the schematic arrangements of pressing devices respectively constituted by using lever units according to other different embodiments of the present invention.

In the embodiment shown in FIG. 2, the positions of a movable fulcrum regulator 12 and a movable force point regulator 13 are exchanged when compared to the case of FIG. 1. Except that, the embodiment of FIG. 2 is the same as that of FIG. 1.

More specifically, in the embodiment of FIG. 2, a motor 14 is stopped first and only a motor 15 is driven, so that the movable force point regulator 13 is moved in order to move an action point link 16 from a position A to a mold locking position B. Then, the motor 15 is stopped and the motor 14 is driven, so that a pressure is applied to the movable fulcrum regulator 12, thereby locking an injection mold 20.

Both the embodiments of FIGS. 1 and 2 show cases wherein the lever unit having the movable fulcrum regulator 12 is used. The present invention is not limited to these embodiments, but other embodiments in which a movable force point regulator and a movable action point regulator are combined with respect to a stationary fulcrum are also possible.

Figure 3:
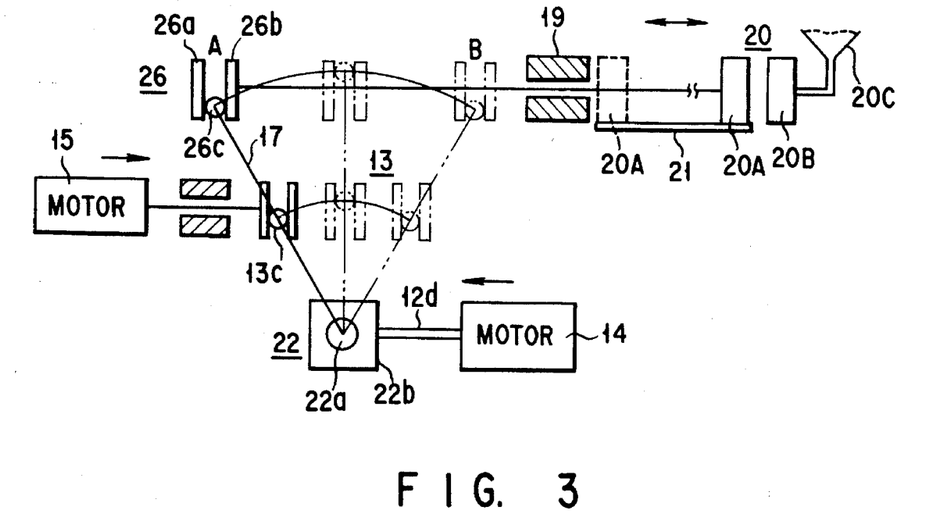
Figure 4:
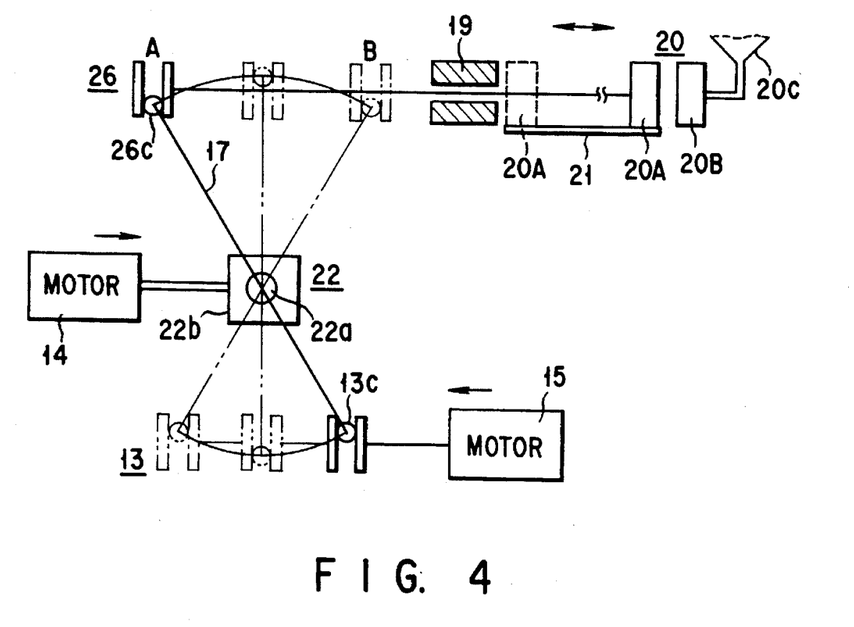

FIGS. 3 and 4 show such embodiments. FIG. 3 shows a case wherein a lever unit has an external fulcrum, and FIG. 4 shows a case wherein a lever unit has an inner fulcrum.

Referring to FIG. 3, a fulcrum 22 is constituted by a shaft 22a for pivotally supporting one end of a lever member 17, and a bearing 22b. The bearing 22b is connected to a motor 14 through a drive shaft 12d. The fulcrum 22 is arranged to be movable by the motor 14 in a direction indicated by an arrow. When not driven by the motor 14, the fulcrum 22 serves as a stationary fulcrum. A movable force point regulator 13 has the arrangement as that of FIGS. 1 and 2. An action point regulator 26 is provided to the action point. The action point regulator 26 has a structure in which an action point roller 26c is inserted between parallel guide plates 26a and 26b. The action point regulator 26 is connected to an injection mold 20A through a connecting member 18. The action point roller 26c is rotatably mounted on the other end of the lever member 17.

Referring to FIG. 3, the motor 14 is kept stopped, and a motor 15 is driven to move the action point regulator 26 from a point A to a point B (by, e.g., 5 cm) in FIG. 3. At this time, since one end of the lever member 17 is supported by the fulcrum shaft 22a as a stationary fulcrum, although the tracks of a force point roller 13c of the movable force point regulator 13 and the action point roller 26c of the movable action point regulator 26 respectively form arcs, the regulators 13 and 26 as a whole perform linear movement. The mold 20A mounted to the connecting member 18 connected to the movable action point regulator 26 is moved to its mold locking position.

In this state, the motor 15 is stopped and the motor 14 is driven to slightly (e.g., for 1 mm) move the fulcrum 22 through the drive shaft 12d to the left in FIG. 3. Then, the lever member 17 is further slightly rotated clockwise about the movable force point regulator 13 as a fulcrum, so that the mold 20A is further pushed against a mold 20B, thereby performing mold locking.

In the embodiment shown in FIG. 4, a motor 14 is stopped first and a motor 15 is driven in order to rotate a lever member 17 clockwise about a fulcrum roller 22a, thereby moving a mold 20A to a mold locking position. Then, the motors 15 and 14 are stopped and driven, respectively, thereby further applying a pressure to the mold 20A.

In order to explain the effect of energy conservation of a 50-ton injection machine mold locking device fabricated according to the present invention, the capacity of a necessary motor will be compared with the capacities of motors employed in the conventional toggle and crank systems. Regarding the conditions, the mold locking force is 50 ton, the stroke is 250 mm, the dry cycle time of the mold locking portion is 3 seconds, and the actual output position of a mold locking force is 4 mm above the lower dead point.

Figure 5:
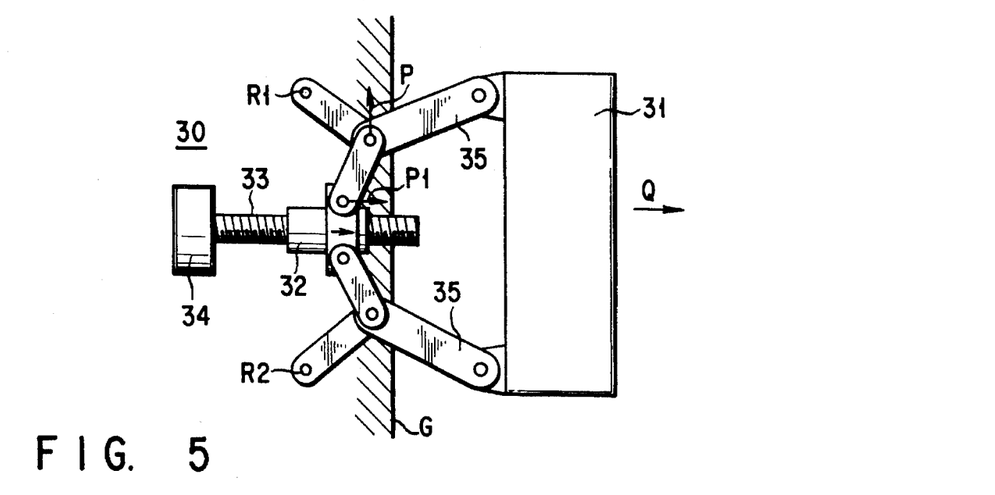
FIGS. 5 and 6 are diagrams showing the arrangements and numerical values of the respective portions of a conventional toggle mechanism when a mold is moved with it to perform mold locking.
Figure 6:
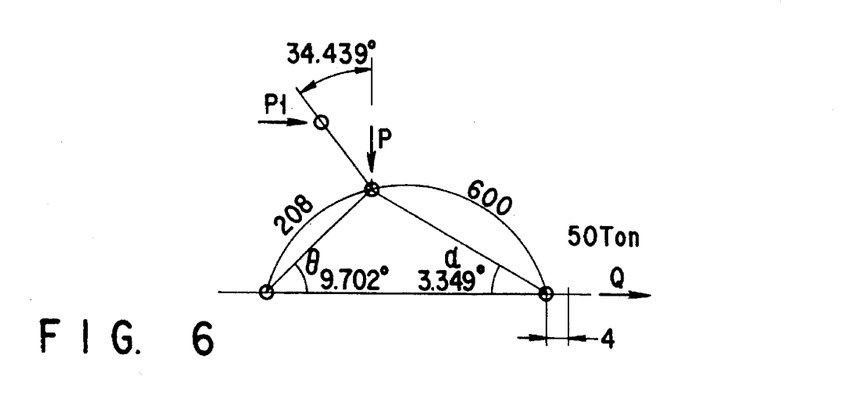

FIG. 5 is a diagram showing the schematic arrangement of the toggle system, and FIG. 6 is a diagram for explaining the operation of the toggle system shown in FIG. 5. Referring to FIG. 5, in order to move a mold 31 mounted to a toggle unit 30 fixed to a ground G at points R1 and R2 in a direction indicated by an arrow, a screw rod 33 threadably engaged with a nut 32 is rotated by a motor 34. As a result, the nut 32 is moved in the direction indicated by an arrow, and the angle of arms 35 is increased, thereby moving the mold 31.

If thrusts P1 and P and the values of the respective portions of the toggle in FIG. 5 are as indicated in FIG. 6, the motor capacity is calculated in the following manner:

① Thrust $P_1$ $$Q = P\cos\theta \frac{\cos\alpha}{\sin(\alpha + \theta)}$$

-continued $$P = \frac{Q \times \sin(\alpha + \theta)}{\cos\theta \times \cos\alpha}$$

$$= \frac{50000 \times \sin(3.349 + 9.702)}{\cos 9.702 \times \cos 3.349}$$

$$= 11474 \text{ kg}$$

$$P_1 = P \tan\theta$$

$$= 11474 \times \tan 34.439°$$

$$= 7869 \text{ kgf}$$

② Transforming portion of ball screw

Ball screw  φ45 × 10

Effective diameter $d_2 = 46.75$

Angle θ of torsion is:

$$\theta = \tan^{-1}(P/\pi \times d_2)$$

$$= \tan^{-1}(10/\pi \times 46.75)$$

$$= 3.895°$$

Efficiency η of screw (frictional coefficient μ of screw= 0.005) is:

$$\eta = \frac{1 - \mu \tan\theta}{1 + \mu/\tan\theta} \times 100 \text{ (\%)}$$

$$= \frac{1 - 0.005 \tan 3.895°}{1 + 0.005/\tan 3.895°}$$

$$= 93.1\%$$

A thrust generated in screw rod is:

$$F_1 = \frac{2\pi \times \eta \times T}{l \times 10^{-3}}$$

The necessary torque T is:

$$T = F_1 \times \frac{l \times 10^{-3}}{2\pi \times \eta}$$

$$= 7869 \times \frac{10 \times 10^{-3}}{2\pi \times 0.931}$$

$$= 13.45 \text{ kgm}$$

$$= 1345 \text{ kgcm}$$

③ Motor capacity

A nut moving amount of 412 mm is required to move the mold for 250 mm. Since one side tact is 1.5 sec, 412 mm/1.5 s=274 mm/sec The frequency of the motor is:

$$\frac{274}{10} \text{ r/sec} \rightarrow 1650 \text{ rpm}$$

The necessary motor capacity is:

$$P_W = \frac{NT}{97.4} \quad\quad N; \text{Frequency} \quad \text{rpm}$$
$$\quad\quad\quad\quad\quad\quad T; \text{Torque} \quad \text{kgcm}$$

$$= \frac{1650 \times 1345}{97.4}$$

$$= 22785 \text{ w}$$

$$= 22.785 \text{ kw}$$

Figure 7:
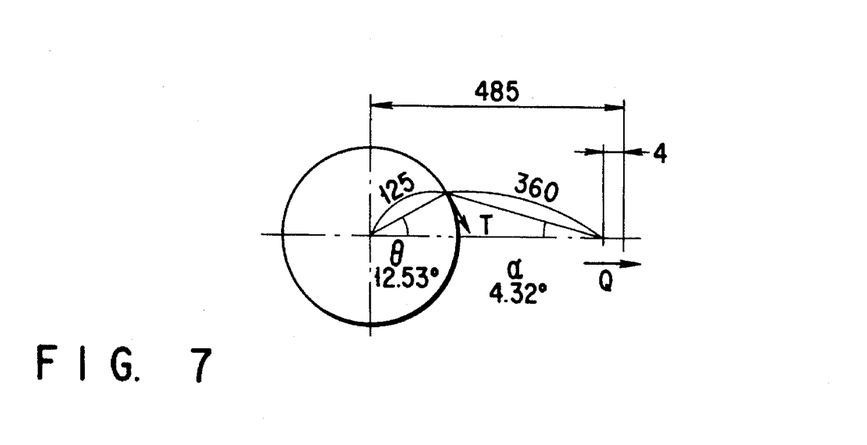
FIGS. 7 and 8 are diagrams showing the arrangements and numerical values of the respective portions of a conventional crank mechanism when a mold is moved with it to perform mold locking.

A motor capacity required when the mold is moved under the same conditions as those of the above case in accordance with the crank movement shown in FIG. 7 will be calculated. From the values of the respective portions of the crank movement as indicated in FIG. 7, a torque T and a motor capacity for generating a mold locking force Q can be calculated as follows:

2. Crank Motion

① Necessary torque $$Q = \frac{T}{r} \times \frac{\cos\alpha}{\sin(\alpha + \theta)}$$

$$T = Q \times \frac{r \times \sin(\alpha + \theta)}{\cos\alpha}$$

$$= 50000 \times \frac{12.5 \times \sin(12.53 + 4.32)}{\cos 4.32°}$$

$$= 181683 \text{ kgcm}$$

$$= 1816.83 \text{ kgm}$$

② Motor capacity

Tact 1.5 sec→1 cycle 3 sec→20 rpm

The necessary motor capacity is:

$$P_W = \frac{NT}{97.4}$$

$$= \frac{20 \times 181683}{97.4}$$

$$= 37307 \text{ w}$$

$$= 37.307 \text{ kw}$$

When the transmission efficiency obtained by the reduction gear is assumed to be 80%;

$$P_W = \frac{37.3}{0.3} \text{ kw} = 46 \text{ kw}$$

Figure 8:
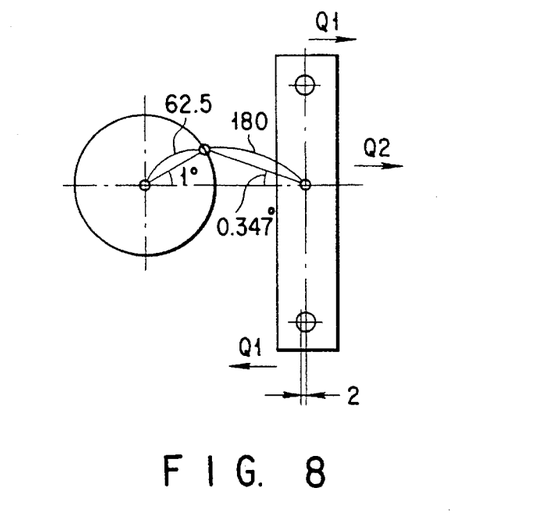
Figure 9:
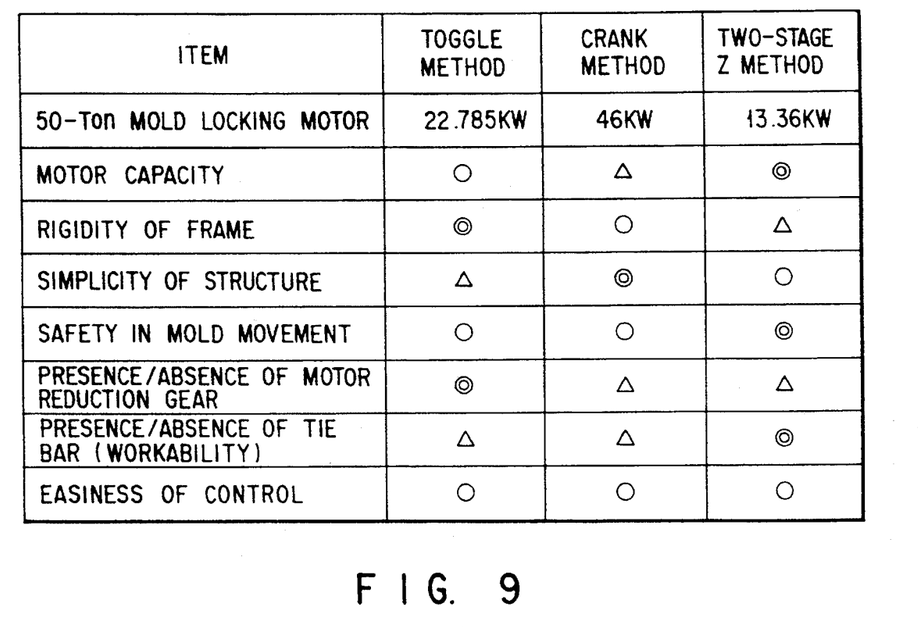
FIG. 9 is a table showing the advantages and disadvantages of the various types of operations that are performed in accordance with the toggle method, crank method, and two-stage drive method according to the present invention.

The total capacity of two motors employing the two-stage motor drive method according to the present invention will be calculated for a crank motion having values as shown in FIG. 8. The tact of the first stage is 1 second, and is 2 seconds in one cycle, and the frequency of the motor is 30 rpm. The tact of the second stage is 0.5 second, and is 1 second in one cycle, and the frequency of the motor is 60 rpm.

① First stage $$Q_2 = \frac{T}{r} \times \frac{\cos\alpha}{\sin(\alpha + \theta)} \quad\quad \begin{cases} Q_2 = 10 \text{ Ton} \\ r = 6.25 \text{ cm} \\ \alpha = 0.347° \\ \theta = 1' \end{cases}$$

-continued
$$T = Q_2 + \frac{r \times \sin(\alpha + \theta)}{\cos\alpha}$$
$$= 100000 \times \frac{6.25 \times \sin 1.347°}{\cos 0.347°}$$
$$= 14692 \text{ kgcm}$$

The motor capacity is:

$$P_{W1} = \frac{NT}{97.4} = \frac{30 \times 14692}{97.4}$$
$$= 4525 \text{ W}$$
$$= 4.525 \text{ kW}$$

When the transmission efficiency obtained by the reduction gear is assumed to be 80%, $$P_W = \frac{4.525}{0.8} \text{ kW} = 5.66 \text{ kW}$$

② Second stage

The necessary torque T is:

$$T = Q_1 \times r$$
$$= 50000 \times 0.2$$
$$= 10000 \text{ kgcm}$$
$$= 100 \text{ kgm}$$

The motor capacity is:

$$P_{W1} = \frac{NT}{97.4} = \frac{60 \times 10000}{97.4}$$
$$= 6160 \text{ W}$$
$$= 6.16 \text{ kW}$$

When the transmission efficiency obtained by the reduction gear is assumed to be 80%, $$P_W = \frac{6.16}{0.8} = 7.7 \text{ kW}$$

Total motor capacity 13.36 kW

Figure 10:
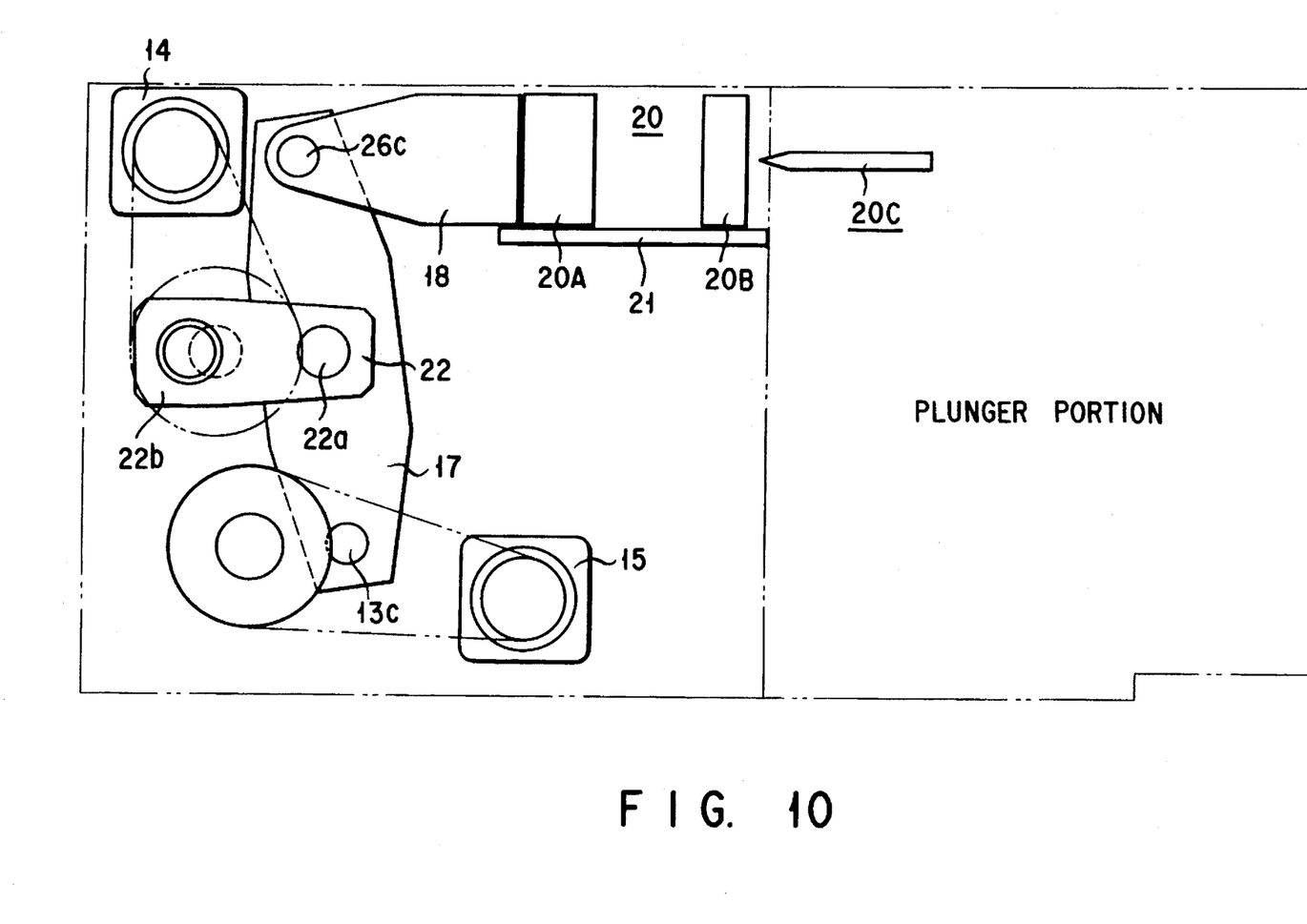
FIG. 10 is a diagram showing the schematic arrangement of an example in which the present invention is applied to a plastic injection machine.

FIG. 10 shows an embodiment in which the present invention is applied to a plastic injection machine. In this embodiment, the lever unit has an inner fulcrum, which corresponds to the embodiment of FIG. 2. Accordingly, for the sake of easy description, portions correspond to those in FIG. 2 are denoted by the same reference numerals, and a detailed description thereof will be omitted.

Referring to FIG. 10, a fulcrum 12 of a lever member 17 is supported by a fulcrum support member 12A. The fulcrum support member 12A is provided as a combination with an eccentric cam 12B, and is urged to the right in FIG. 10 by a motor 14.

A force point regulator 13 is connected to a motor 15 through a crank mechanism 13A, and the lever member 17 is rotated clockwise about the fulcrum 12.

An action point 16 is formed on the other end of the lever member 17 and connected to one injection mold 20A through a link mechanism 18.

More specifically, when the motor 15 is driven, the lever member 17 is rotated clockwise, and the injection mold 20A is slidably moved on a rail 21 to a position to contact the other injection mold 20B. During this movement, the motor 14 is stopped. When the motor 14 is driven, the eccentric cam 12B is rotated to urge the fulcrum 12 to the right, so that the mold 20A is urged against the mold 20B, thereby locking the injection mold.

When the mold locking travel ends, a molten plastic material is injected from an injection plunger 20C into the locked injection mold through a nozzle 20D.

As has been described above, according to the present invention, various advantages to be described as follows can be obtained.

The fulcrum/movable force point interchangeable pressure applying system of a lever unit and the movable fulcrum/movable force point interchangeable pressure applying system of a lever unit have all the advantages of the fulcrum/movable force point system of a lever unit and the movable fulcrum system of a lever unit, respectively.

When an injection machine is considered as a position control example accompanying pressure application by a movable fulcrum/movable force point interchangeable pressure applying system, movement of the mold and pressure application can be performed by separate motors, thereby achieving energy conservation.

When a dynamic shock absorber is constituted by employing a movable fulcrum/movable force point interchangeable pressure applying system, position control is enabled by controlling the speed of a reversible motor.

When punching is performed by a punch press, if a slow speed is employed during a punching operation, the shock noise is decreased, and a separate motor can be used, thereby achieving energy conservation. The same effect can be obtained with a vender as well.

Screw: The energy efficiency is twice or more that of a toggle type pressure application system and is thus superior.

The movable fulcrum mechanism has a higher total energy efficiency and is thus superior to the conventional hydraulic or pneumatic method.

Screw: The energy efficiency is twice or more that of a toggle type pressure application system and is thus superior.

Since the basic transmission of the power transmission vector is right-angle transmission, a fatigue is not easily applied to the transmission system, and a high endurance is obtained.

Since the movable fulcrum moves smoothly, lateral vibration does not easily occur, so that a fatigue is not easily applied to the transmission system, thereby obtaining a high endurance.

Since input and output are well-balanced, various advantages are obtained.

The rotary power source and the movable fulcrum system can be easily arranged at lower and upper portions, respectively, thereby providing a machine system having a low center of gravity. . . . down heavy The weight ratio is about ⅓ that of the conventional toggle pressing machine. . . . top heavy Non-uniform wear does not easily occur since automatic center adjustment is performed.

I claim:

1. A machine apparatus comprising:
 a lever unit having a lever member pivotally supported by a stationary fulcrum and having a force point and an action point, a force point regulator connected to said force point of said lever member, and an action point regulator connected to said action point, said force point and said action point being movable in the corresponding regulators as said lever member is rotated;

a first driving source for driving said force point regulator, thereby rotating said lever member; and a second driving source for driving said stationary fulcrum, thereby applying a pressure to said action point through said force point as a fulcrum.

2. A machine apparatus comprising:

a lever unit having a lever member pivotally supported by a fulcrum and having a force point and an action point, a fulcrum regulator connected to said fulcrum of said lever member, and a force point regulator connected to said force point, said fulcrum and said force point being movable in the corresponding regulators as said lever member is rotated;

a first driving source for driving said force point regulator, thereby rotating said lever member; and a second driving source for driving said fulcrum regulator, thereby applying a pressure to said action point through said force point as a fulcrum.

3. A pressing device comprising:

a lever unit having a lever member pivotally supported by a stationary fulcrum and having a force point and an action point, a force point regulator connected to said force point of said lever member, and an action point regulator connected to said action point, said force point and said action point being movable in said corresponding regulators as said lever member is rotated;

a first driving source for driving said force point regulator, thereby rotating said lever member;

a second driving source for driving said stationary fulcrum, thereby applying a pressure to said action point through said force point as a fulcrum; and a head connected to said action point regulator and driven by an operation of said lever unit.

\* \* \* \* \*